US007632332B2

(12) United States Patent
Brooks et al.

(10) Patent No.: US 7,632,332 B2
(45) Date of Patent: Dec. 15, 2009

(54) PREPARATION OF IRON-TITANIUM NANOPARTICLES

(75) Inventors: Christopher J. Brooks, Dublin, OH (US); Jonathan Veinot, St. Albert (CA); Janet MacDonald, Edmonton (CA); Bryan Rowsell, Red Deer (CA); Victoria Russell, Edmonton (CA)

(73) Assignees: Honda Motor Co., Ltd., Tokyo (JP); The Governors of the University of Alberta, Edmonton (CA)

( * ) Notice: Subject to any disclaimer, the term of this patent is extended or adjusted under 35 U.S.C. 154(b) by 263 days.

(21) Appl. No.: 11/637,057

(22) Filed: Dec. 12, 2006

(65) Prior Publication Data

US 2008/0134836 A1 Jun. 12, 2008

(51) Int. Cl.
*B22F 9/24* (2006.01)
(52) U.S. Cl. .......................................... 75/351; 75/362
(58) Field of Classification Search ........................ None
See application file for complete search history.

(56) References Cited

U.S. PATENT DOCUMENTS

| | | | |
|---|---|---|---|
| 5,840,111 | A | 11/1998 | Wiederhoft et al. |
| 6,302,940 | B2 | 10/2001 | Murray et al. |
| 6,468,497 | B1 | 10/2002 | Khan et al. |
| 6,610,135 | B1 | 8/2003 | Ohmori et al. |
| 2004/0243386 | A1 | 12/2004 | Stolowitz et al. |
| 2004/0247503 | A1* | 12/2004 | Hyeon .......................... 423/1 |
| 2005/0214190 | A1* | 9/2005 | Hyeon et al. ................. 423/299 |

FOREIGN PATENT DOCUMENTS

| | | |
|---|---|---|
| JP | 6199636 | 7/1994 |
| WO | 03/031323 A1 | 4/2003 |

OTHER PUBLICATIONS

Liang, G.; Huot, J.; and Schulz, R., "Mechanosynthesis of Hydrogen Storage Alloys", Materials Science Forum, vols. 386-388, pp. 603-608 (2002), Trans Tech Publications, Switzerland.
Huot, J.; Liang, G.; and Schulz, R., "Mechanically alloyed metal hydride systems", Appl. Phys. A, vol. 72, pp. 187-195 (2001).
Sun, L.; Liu, H.; Bradhurst, D.H.; and Dou, S., "Formation of FeTi hydrogen storage alloys by ball-milling", J. Materials Science Letters, vol. 17, pp. 1825-1830 (1998), Kluwer Academic Publishers.
Tessier, P.; Schulz, R.; and Strom-Olsen, J.O., "Elastic stress in composite FeTi hydrogen storage materials", J. Mater. Res., vol. 13, No. 6, pp. 1538-1547 (Jun. 1998), Materials Research Society.

(Continued)

*Primary Examiner*—George Wyszomierski
(74) *Attorney, Agent, or Firm*—Capitol City TechLaw, PLLC; Mark E. Duell

(57) ABSTRACT

The present teachings are directed towards methods of producing iron and titanium-containing nanoparticles by reducing iron and titanium-containing precursors with alkali or alkaline-earth metal-containing reducing agents in the presence of a suitable surfactant, and by the thermolysis of iron and titanium-containing precursors without alkali or alkaline-earth metal-containing reducing agents present.

12 Claims, 4 Drawing Sheets

OTHER PUBLICATIONS

Zaluska, A.; Zaluski, L. and Strom-Olsen, J.O., "Structure, catalysis and atomic reactions on the nano-scale: a systemic approach to metal hydrides for hydrogen storage", Appl. Phys. A, vol. 72, pp. 157-165 (2001).

Bratanich, T.; Solonin, S. and Skorokhod, V., "Hydrogen Sorption Peculiarities of Mechanically Activated Intermetallic TiFe and TiFe-MmNi$_5$(LaNi$_5$) Mixtures", Int. J. Hydrogen Energy, vol. 21, No. 11/12, pp. 1049-1051 (1996), Elsevier Science Ltd, Great Britain.

Zaluski, L.; Zaluska, A.; Tessier, P.; Strom-Olsen, J.O; and Schulz, R., "Hydrogen absorption by nanocrystalline and amorphous Fe-Ti with palladium catalyst, produced by ball milling", J. Materials Science, vol. 31, pp. 695-698 (1996), Chapman & Hall.

Dutta, K.; Mandal, P.; Ramakrishna, K. and Srivastava, O.N., "The Synthesis and Hydrogenation Behaviour of some New Composite Storage Materials: Mg-xwt% FeTi(Mn) and La$_2$Mg$_{17}$-xwt% LaNi$_5$", Int. J. Hydrogen Energy, vol. 19, No. 3, pp. 253-257 (1994), Elsevier Science Ltd., Great Britain.

Aoki, K.; Aoyagi, H.; Memezawa, A. and Masumoto, T., "Effect of ball milling o the hydrogen absorption rate of FeTi and Mg$_2$Ni compounds", J. Alloys and Compounds, vol. 203, L7-L9 (1994), Elsevier Sequoia.

Zhu, H.Y.; Wu, J. and Wang, Q.D., "Disproportionation of LaNi$_5$ and TiFe in 4 MPa H$_2$ at 300°C.", J. Alloys and Compounds, vol. 185, pp. 1-6 (1992), Elsevier Sequoia.

Singh, M.; Vijay, Y.K. and Jain, I.P., "The Temperature Dependence of FeTi and FeTiS. Thin Films Obliquely Deposited for the Hydrogen Absorption-Desorption Mechanism", Int. J. Hydrogen Energy, vol. 16, No. 7, pp. 485-490 (1991), Pergamon Press.

Kulshreshtha, S.K.; Sasikala, R.; Suryanarayana, P.; Singh, A.J. and Iyer, R.M., "Studies on Hydrogen Storage Material FeTi: Effect of Sn Substitution", Mat. Res. Bull., vol. 23, pp. 333-340 (1998), Pergamon Press.

Shaltiel, D.; Von Waldkirch, TH.; Stucki, F. and Schlapbach, L., "Ferromagnetic resonance in hydrogentaed LaNi$_5$, FeTi and Mg$_2$Ni and its relation to magnetic and surface investigations", J. Physics F, Metal Physics, vol. 11, No. 2, pp. 471-485 (Jan. 1981), The Institute of Physics.

* cited by examiner

0
PREPARATION OF IRON-TITANIUM NANOPARTICLES

BACKGROUND

1. Field of the Invention

This invention relates to methods for the preparation of iron and titanium-containing nanoparticles.

2. Discussion of the Related Art

Particles with average sizes of less than about 200 nanometers, that is, nanoparticles, are of interest because their crystalline properties and other nanoscale features can dramatically change the properties of the material. The resulting unique mechanical, magnetic and electrical properties of nano-sized materials cause them to be of great interest.

It is well known in the art to prepare nanoparticles of various compositions by, for instance, mechanical alloying, mechanical grinding and ball milling of large particles until the desired crystal domain size is obtained. These grinding processes are time consuming, energy intensive, and produce a powder with a broad distribution of crystal domain sizes, including particles of larger undesirable sizes. The powder can also contain crystal domains encapsulated by larger particles of unwanted material. Additionally, the grinding materials utilized in the processes can contaminate the nanoparticle product.

A need exists, therefore, for methods of preparing nanoparticles, particularly iron and titanium-containing nanoparticles, which provide for control over the size of the resulting nanoparticles.

SUMMARY

The present teachings meet the needs for methods of producing nanoparticles with control over the particle size of the resulting nanoparticles, particularly for nanoparticles composed of iron and titanium.

The present teachings provide a method for producing nanoparticles by providing one or more metal-containing precursors and an alkali or alkaline-earth metal reducing agent. Then contacting the metal-containing precursors with the alkali or alkaline-earth metal reducing agent to produce nanoparticles of the one or more metals.

The present teachings further include a method of producing iron and titanium-containing nanoparticles by providing iron chloride and titanium chloride, and providing an alkali or alkaline-earth metal reducing agent. Then contacting the iron chloride and titanium chloride with the alkali or alkaline-earth metal reducing agent to produce iron and titanium-containing nanoparticles.

Another method of producing nanoparticles provided by the present teachings includes providing an iron-containing organometallic component and a titanium-containing organometallic component, and contacting the iron-containing organometallic component and the titanium-containing organometallic component in the presence of a surfactant. The iron-containing organometallic component, the titanium-containing organometallic component and the surfactant are then heated to produce iron and titanium-containing nanoparticles. The contacting occurs in the presence of a surfactant and control of the particle size can be obtained by controlling the concentration of the surfactant.

Yet another method provided by the present teachings features capping iron and titanium-containing nanoparticles with another metal, such as nickel or palladium. The capping metal precursor can be contacted with the iron and titanium-containing nanoparticles and then heat can be applied to the system to produce the metal-capped iron and titanium-containing nanoparticles.

BRIEF DESCRIPTION OF THE DRAWINGS

The accompanying drawings which are included to provide a further understanding of the present teachings and are incorporated in and constitute a part of this specification, illustrate various embodiments of the present teachings and together with the detailed description serve to explain the principles of the present teachings. In the drawings.

DETAILED DESCRIPTION

Figure 1:
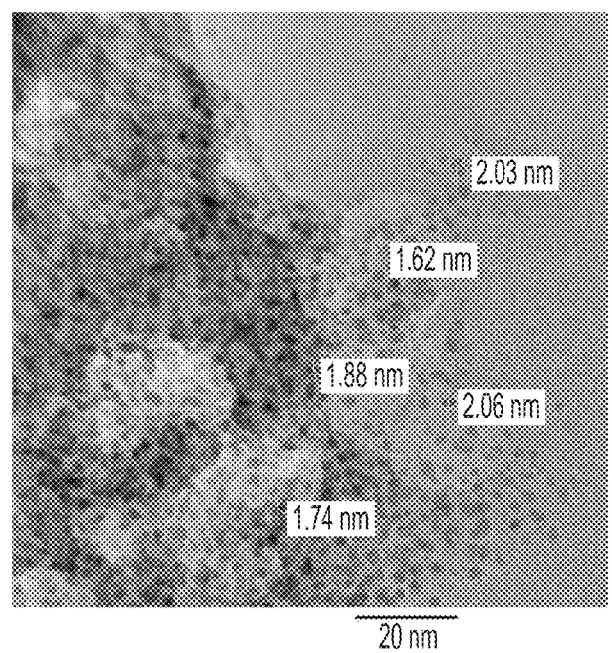
FIG. 1 is a TEM micrograph of iron and titanium-containing nanoparticles formed by an alkali metal reduction method according to the present teachings.

The present teachings are directed to methods of producing nanoparticles, particularly nanoparticles composed of iron and titanium, with particle size controlled during the production of the nanoparticles.

One method of producing nanoparticles presently taught is achieved by providing an iron-containing organometallic component and a titanium-containing organometallic component which are then contacted with one another in the presence of a surfactant. The resulting combination of the iron-containing organometallic component, the titanium-containing organometallic component and the surfactant can then be reacted, preferably with heating, or thermolysis, to produce iron and titanium-containing nanoparticles. The combination can be heated up to close to 300 C. to produce the desired iron and titanium-containing nanoparticles.

After cooling to room temperature, the method can further involve contacting the iron and titanium-containing nanoparticles with a metal-containing precursor, and then reacting, preferably with heating, the iron and titanium-containing nanoparticles and the metal-containing precursor to produce metal-capped iron and titanium-containing nanoparticles. Again, the reaction mixture can be heated close to 300 C. to produce the desired metal-capped iron and titanium-containing nanoparticles.

The metal-containing precursor can be any organometallic component capable of forming metal-capped nanoparticles, for instance, the organometallic component capable of forming metal-capped nanoparticles can have an organic portion comprising one or more element selected from the group consisting of acetate, formate, carbonate, acetylacetonate, acetonitrile, tetrahydrofuran, cyclopentadienyl, cyclooctyldienyl and carbonyl, and a metal portion comprising one or more element selected from the group consisting of cobalt, ruthenium, iridium, nickel, palladium, platinum, copper, silver and gold.

Specific examples of suitable organometallic components capable of forming metal-capped nanoparticles can include any of nickel(II) acetylacetonate, nickel tetracarbonyl, copper (II) acetylacetonate, copper(II) acetate, bisacetonitriledichloropalladium(II) and palladium(II) acetylacetonate.

The metal-containing precursor can also be any metal halide or nitrogen oxide-containing component capable of forming metal-capped nanoparticles, for instance, the metal halide or nitrogen oxide-containing component capable of forming metal-capped nanoparticles can have a metal portion comprising one or more element selected from the group consisting of cobalt, ruthenium, iridium, nickel, palladium, platinum, copper, silver and gold and a halide or nitrogen oxide-containing portion comprising one or more element selected from the group consisting of chloride, bromide, nitrite and nitrate.

Specific examples of suitable metal halide or nitrogen oxide-containing components include any of $PdCl_2$, $CuCl_2$, $NiCl_2$, $Pd(NO_3)_2$, $Cu(NO_3)_2$ and $Ni(NO_3)_2$.

In the presently taught method, the particle size of the iron and titanium-containing nanoparticles can be controlled by varying the surfactant concentration. The particle size of the iron and titanium-containing nanoparticles can be controlled to be less than about 6 nanometers, less than about 4 nanometers, or less than about 2 nanometers, for instance.

A suitable surfactant, or mixture of surfactants, can include one or more of oleic acid, oleyl amine, trioctylphosphine oxide ("TOPO"), trioctyl phosphine ("TOP"), stearic acid and cetyltrimethylammonium bromide ("CTAB"), Triton X-100 (a mixture of polyoxyethylene tert-octylphenyl ethers) and TWEEN-80 (polysorbate 80). Specifically, a suitable surfactant should have a suitable affinity for the surface of the metal particle to be utilized in the present method.

Examples of some iron-containing organometallic components suitable for the present method include iron pentacarbonyl, iron cyclooctyldienyl and iron acetylacetonate. Examples of titanium-containing organometallic components suitable for the present method include bis(cyclopentadienyl)dicarbonyl titanium, titanium alkoxides such as titanium isopropoxide, titanium butadiene, and bistoluene titanium. Suitable compounds should be sufficiently soluble in the chosen solvent system and have decomposition temperatures below about 700 C.

The present teachings also include a method of producing iron and titanium-containing nanoparticles by providing iron chloride and titanium chloride, and an alkali or alkaline-earth metal reducing agent, which are then contacted with one another to produce iron and titanium-containing nanoparticles. The method can further include an additional step of oxidizing the nanoparticles comprised of iron and titanium to produce oxygen-containing nanoparticles.

The alkali or alkaline-earth metal reducing agent utilized in the present method can include a lithium, sodium, potassium or magnesium-containing reducing agent. Specific suitable alkali and alkaline-earth metal reducing agents include, for example, sodium metal, potassium metal, sodium borohydride, sodium naphthalide, potassium triethyl borohydride, magnesium metal and magnesium anthracide.

A surfactant can be contacted with the one or more metal-containing precursors and the alkali or alkaline-earth metal reducing agent. Examples of suitable surfactants include one or more of oleic acid, oleyl amine, trioctylphosphine oxide ("TOPO"), trioctyl phosphine ("TOP"), stearic acid, cetyltrimethylammonium bromide ("CTAB"), Triton® X-100 (a mixture of polyoxyethylene tert-octylphenyl ethers) and TWEEN®-80 (polysorbate 80). Specifically, a suitable surfactant must have a suitable affinity for the surface of the metal particle to be utilized in the present method.

Suitable concentrations of the surfactants are dependent on the type of surfactant utilized, and can range from about 0.1% to about 100%, from about 10% to about 90%, from about 25% to about 75%, or from about 40% to about 60% volume based on the total volume of surfactant and solvent. In some instances, the surfactant concentration can be less than about 5%, less than about 3%, or less than about 1%. The concentration of surfactant utilized in the reaction mixture of the present method can control the size of the resulting nanoparticles.

The present teachings also include a method for producing nanoparticles by providing one or more metal-containing precursors and an alkali or alkaline-earth metal reducing agent which are then contacted with each other to produce nanoparticles comprised of the one or more metals.

The method can utilize metal-containing precursors including metal halides, metal alkyls, metal alkoxides and organometallic compounds. Examples of suitable metal halides include iron chloride and titanium chloride.

An additional step of oxidizing the nanoparticles can also be included in the presently taught method. The oxidation step produces nanoparticles containing oxygen and the one or more metals.

The alkali or alkaline-earth metal reducing agent utilized in the present method can include a lithium, sodium, potassium or magnesium-containing reducing agent. Specific suitable alkali and alkaline-earth metal reducing agents include, for example, sodium metal, potassium metal, sodium borohydride, sodium naphthalide, potassium triethyl borohydride, magnesium metal and magnesium anthracide.

A surfactant can be contacted with the one or more metal-containing precursors and the alkali or alkaline-earth metal reducing agent according to the present method. Surfactants appropriate for this method include, for example, oleic acid, oleyl amine, trioctylphosphine oxide, trioctyl phosphine, stearic acid and cetyltrimethylammonium bromide, Triton® X-100 and TWEBN®-80.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Analysis Techniques

Atomic ratios of a material were measured by XPS analysis of the collected materials. TEM was utilized to determine the particle size of the collected materials.

Example 1

Using Schlenk techniques under an argon atmosphere, titanium(IV) chloride (3.35 g, 10.0 mmol), anhydrous iron(III) chloride (1.54 g, 9.50 mmol) and trioctylphosphine oxide (0.010 g, 0.025 mmol) were dissolved in 200 mL of dry tetrahydrofuran in a 250 mL Schlenk flask. Sodium borohydride (2.77 g, 73.2 mmol) was introduced and the mixture was stirred for 12 h at room temperature leaving a blue solution. Additional sodium borohydride was added (0.420 g, 11.1 mmol) and stirred for 12 h affording a black solution. Bisacetonitriledichloropalladium(II) (0.1414 g, 0.545 mmol) was added and the solution was stirred for 12 h at room temperature. The addition of wet tetrahydrofuran followed by water caused gas evolution; additions of wet THF and water were continued until bubbles were no longer observed. A solid product was filtered on a frit followed by three 50 mL washes with 50/50 water/tetrahydrofuran. The precipitate was removed to a round bottom flask and dried under vacuum.

Example 2

Using Schlenk Techniques under an argon atmosphere, titanium(IV) chloride tetrahydrofuran complex (1:2) (0.9611 g, 2.9 mmol), iron(III) chloride (0.4738 g, 2.9 mmol) and trioctylphosphine oxide (0.5826 g, 1.5 mmol) were dissolved in 40 mL of dry dimethoxyethane. While stirring, potassium triethylborohydride (1.0 M in tetrahydrofuran, 22.3 mL, 22.3 mmol) was added dropwise over 15 min. The solution changed from the original yellow-orange to black almost immediately, and the solution was then stirred for 12 h at room temperature. Stirring was stopped and the solution was cooled in the ice/salt bath with white potassium chloride settling to the bottom of the flask. The supernatant was canulated off, and the solvent was removed under vacuum. The dark solid was resuspended in 5 mL of dimethoxyethane and 10 mL of pentane, leaving a black solution over a second crop of potassium chloride. Once again, the supernatant was canulated off. Bisacetonitriledichloropalladium(II) (0.059 g, 227 mmol) was added and stirred for 12 h at room temperature. The product was dried under vacuum. The particles had the atomic ratio of $Fe_{2.63}Ti_{2.92}Pd_{1.24}$, as determined by XPS. The particle size was approximately 3 nm as determined by TEM.

Example 3

Using Schlenk Techniques under an argon atmosphere, titanium(IV) chloride tetrahydrofuran complex (1:2) (0.6401 g, 1.92 mmol), iron(III) chloride (0.3215 g, 1.98 mmol) and cetyltrimethylammonium bromide (0.3504 g, 0.96 mmol) were dissolved in 35 mL of dry toluene. A piece of potassium (0.59 g, 15.1 mmol) was added and the solution was brought to reflux for 3 h then returned to room temperature. Bisacetonitriledichloropalladium(II) (0.0615 g, 0237 mmol) was added and the solution was returned to reflux for 3 h. After cooling to room temperature and settling of a lighter colored salt precipitate, the black supernatant was canulated off. The liquid was allowed to settle for another 2 days affording more white precipitate. The supernatant was canulated off and the solvent was removed under vacuum leaving a black precipitate. The particle size was approximately 10 nm as determined by TEM.

Example 4

Sodium naphthalide was prepared by sonnocating naphthalene (1.029 g, 8.0 mmol) and a sodium piece (0.35 g, 15 mmol) in 20 mL of dimethoxyethane for 30 min under an argon atmosphere. This solution was canulated into a solution of titanium(IV) chloride tetrahydrofuran complex (1:2) (0.3219 g, 0.96 mmol), iron(III) chloride (0.1723 g, 1.06 mmol) and trioctylphosphine oxide (0.2662 g, 0.689 mmol) in 20 mL of dry dimethoxyethane. The reaction was sonnocated for 1 h resulting in a black solution. A light precipitate settled out of the black solution and the supernatant was canulated off into another flask. Settling and canulation were repeated. The solvent was removed under vacuum. A condenser was attached and the flask was submerged in a water bath (80° C.). The vessel was placed under vacuum and naphthalene crystals were collected in the condenser. A black solid remained in the flask.

Example 5

A solution of Bis(cyclopentadienyl)dicarbonyl titanium (II) (0.711 g, 3.04 mmol) in degassed benzyl ether (40 mL), oleic acid (6 mL, 19.0 mmol) and oleylamine (5 mL, 15.2 mmol) was heated under argon to 80° C. Iron pentacarbonyl (0.4 mL, 3.04 mmol) was added and the solution was heated to 200° C. for 20 h giving a black solution. Once returned to room temperature, palladium(II) acetylacetonate (0.0479 g, 0.157 mmol) was added to the solution. The solution was stirred and heated to 260° C. for 12 h. Dry methanol (80 mL) was added and sonnocated for 2 h. A black precipitate settled and the supernatant was removed. Two additional washes with methanol were preformed and then the precipitate was dried under vacuum. The particles isolated from the precipitate had an atomic ratio of $Fe_1Ti_{1.04}$ as determined by XPS. Further isolation of particles from the supernatant yielded particles with the atomic ratio of $Fe_1Ti_{0.34}Pd_{0.05}$. The particle size was approximately 5 nm as determined by TEM.

Example 6

A solution of Bis(cyclopentadienyl)dicarbonyl titanium (II) (0.674 g, 2.9 mmol) in degassed benzyl ether (40 mL), oleic acid (5 mL, 15.8 mmol) and oleylamine (5 mL, 15.2 mmol) was heated under argon to 142° C. Iron pentacarbonyl (0.44 mL, 3.34 mmol) was added and the solution was heated to 290° C. for 12 h giving a black solution. Once returned to room temperature, palladium(II) acetylacetonate (0.022 g, 0.072 mmol) was added to the solution followed by stirring and heating to 290° C. for 12 h. Purification was performed by adding 99% ethanol and centrifugation. A black solid settled and the brown supernatant was decanted off. The solid was suspended in pentane, collected in a Schlenk flask and dried under vacuum. The particles had an atomic ratio of $Fe_{2.03}Ti_{2.92}Pd_{1.24}$, as determined by XPS. The particle size was approximately 5 nm as determined by TEM.

Example 7

Figure 2:
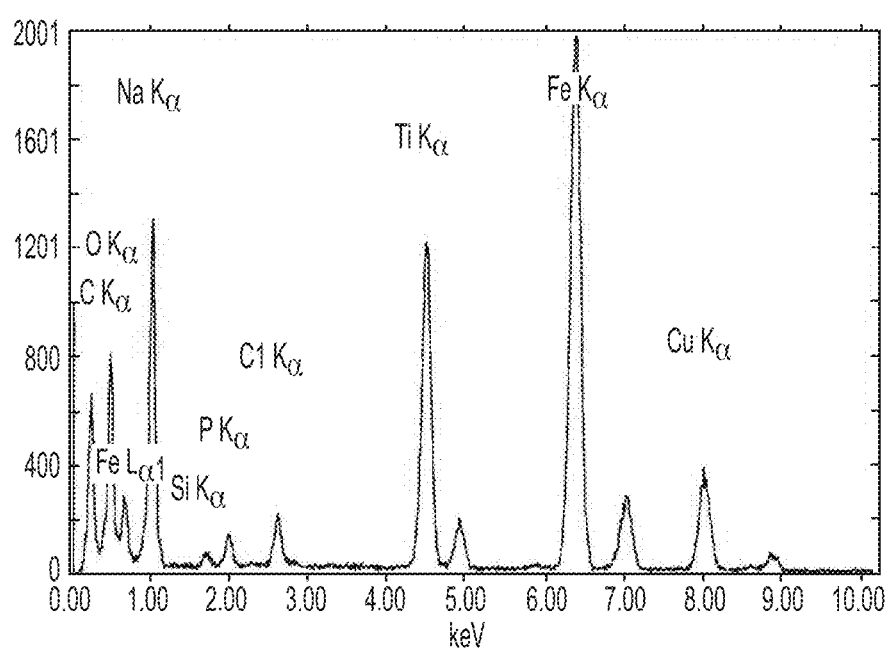
FIG. 2 is an energy dispersive spectrograph of iron and titanium-containing nanoparticles formed by an alkali metal reduction method according to the present teachings.

Iron(III) chloride and titanium(IV) chloride can be reduced by sodium naphthalide in a dimethyl ether reaction solution to produce iron and titanium-containing nanoparticles. FIG. 1 is a TEM micrograph of iron and titanium-containing nanoparticles formed by such an alkali metal reduction method according to the present teachings. FIG. 2 is an EDAX spectra of the iron and titanium-containing nanoparticles formed by a sodium naphthalide reduction of iron and titanium chlorides.

The micrograph and spectra illustrate the size and composition of the nanoparticles formed by sodium naphthalide reduction of a reaction mixture of the chlorides of iron and titanium. The size of the particles is generally less than about 2.0 nm as observed by electron microscopy.

Example 8

Figure 3:
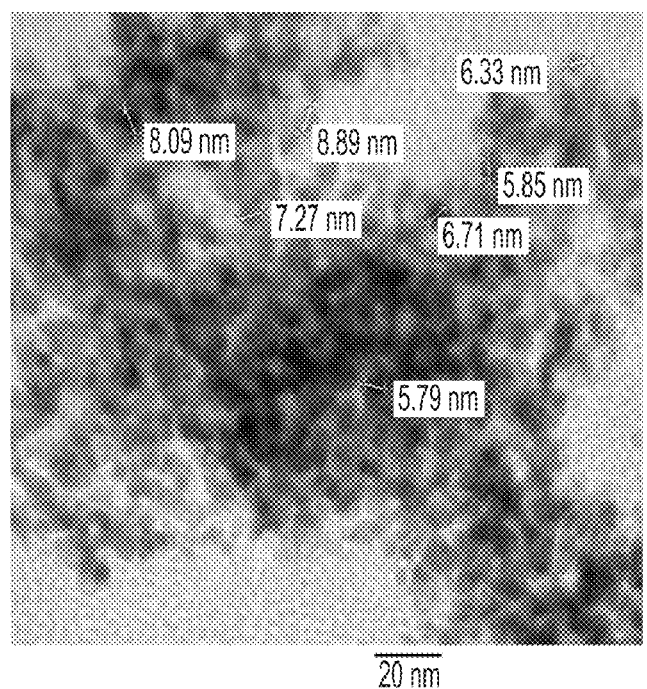
FIG. 3 is a TEM micrograph of iron and titanium-containing nanoparticles formed by the thermolysis of organometallic precursors according to the present teachings.
Figure 4:
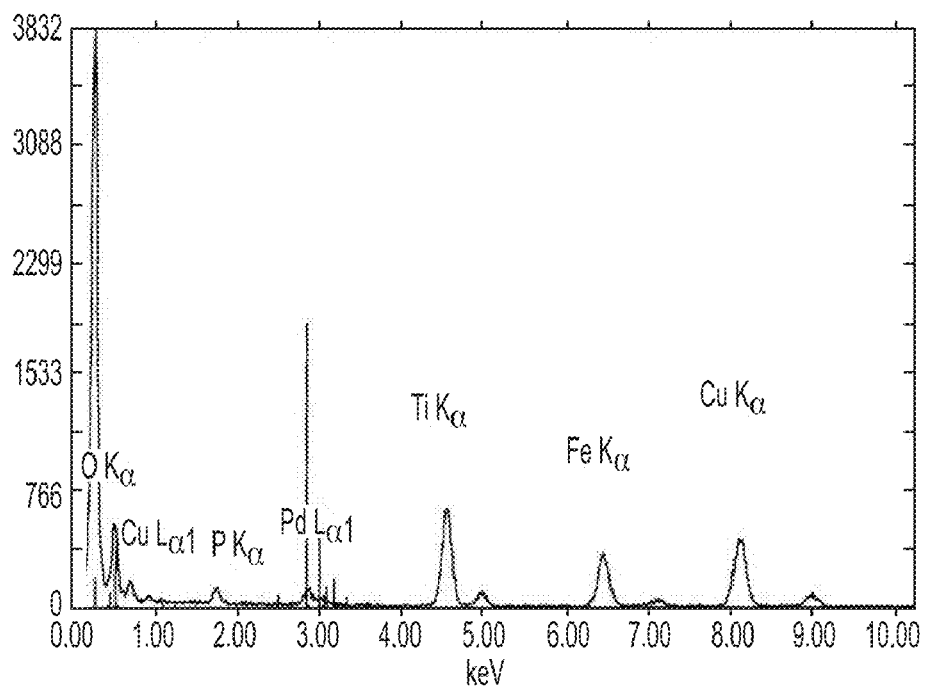
FIG. 4 is an energy dispersive spectrograph of iron and titanium-containing nanoparticles formed by the thermolysis of organometallic precursors according to the present teachings.

Bis(cyclopentadienyl)dicarbonyl titanium(II) and iron pentacarbonyl can be heated in degassed benzyl ether with oleic acid and oleyl amine present as surfactants to about 290 C. under argon. FIG. 3 is a TEM micrograph, and FIG. 4 is an energy dispersive spectrograph of—iron and titanium-containing nanoparticles formed by the thermolysis of organometallic precursors according to the present teachings. The particle size is generally in the range of about 5 nm to about 9 nm.

Example 9

Figure 5:
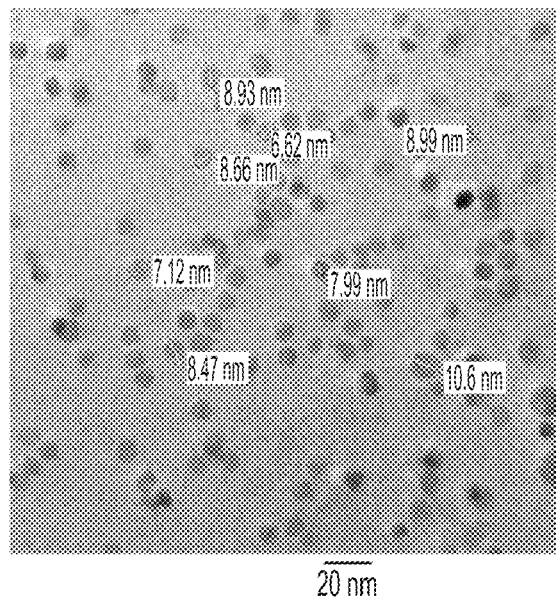
FIG. 5 is a TEM micrograph of iron, titanium and nickel-containing nanoparticles formed from the thermolysis of organometallic precursors, followed by capping with an organonickel precursor according to the present teachings.

Iron and titanium-containing nanoparticles can be formed by the thermolysis of iron and titanium-containing precursors and then reacted with a nickel-containing organometallic precursor, in this case, nickel(II) acetylacetonate to form a iron and titanium-containing nanoparticles capped with nickel. FIG. 5 is a TEM micrograph of the nickel-capped iron and titanium-containing nanoparticles. The particle size is generally in the range of about 7 nm to about 10 nm.

Example 10

The iron and titanium-containing nanoparticles formed by an alkali metal reduction method according to the present teachings, such as illustrated in Examples 4 and 7 above, can be further oxidized by being suspended in dry tetrahydrofuran to which wet THF with approximately 10% water can be added. If no salt is formed, the suspension can be vacuum filtered and washed with wet THF and pentane to produce oxidized iron and titanium-containing nanoparticles. If a salt forms, the suspension can be rotovaporized to dryness, resuspended in water, and then vacuum filtered. The solid can then be washed with water until the filtrate is negative for chloride by a silver nitrate test, and then washed with dry THF and pentane.

Figure 6:
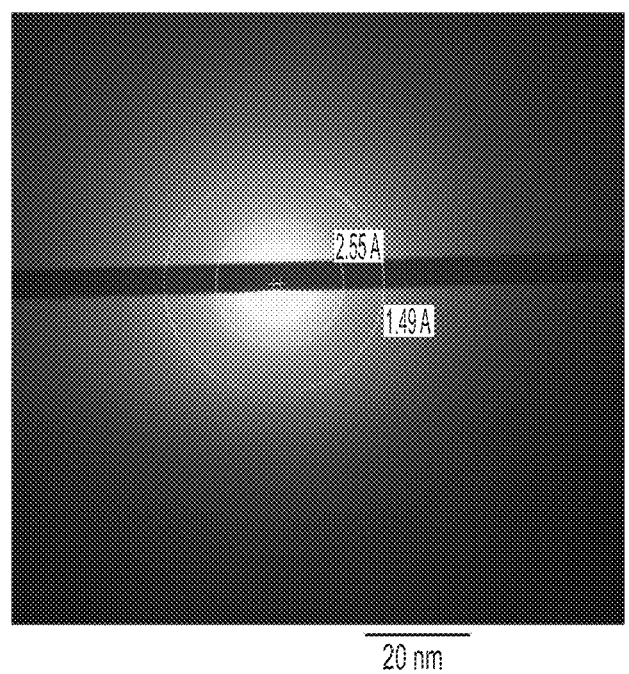
FIG. 6 is a selected area electron diffraction of iron and titanium-containing nanoparticles formed by an alkali metal reduction method according to the present teachings.
Figure 7:
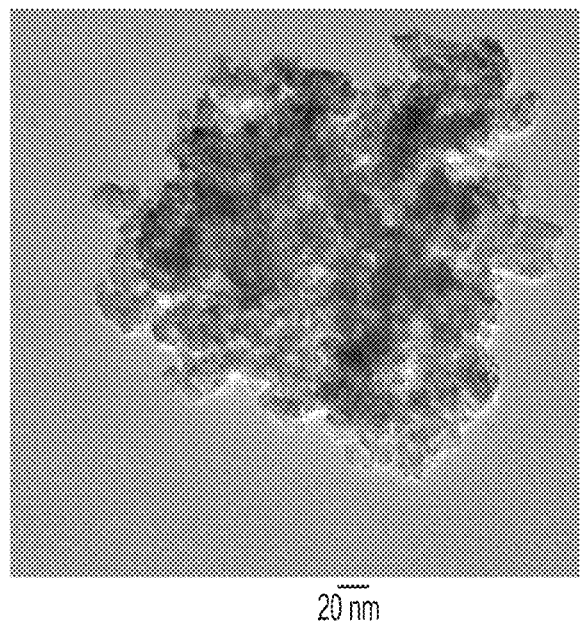
FIGS. 7 and 8 are TEM micrographs at different magnifications of iron and titanium-containing nanoparticles formed by an alkali metal reduction method according to the present teachings.
Figure 8:
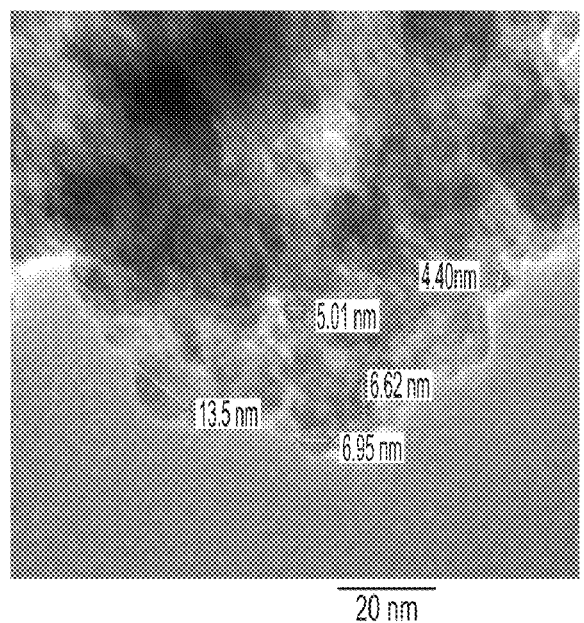

FIG. 6 is a selected area electron diffraction image which shows broadened reflections indicating d-spacings characteristic of the oxidation products of FeTi. FIGS. 7 and 8 are TEM micrographs at different magnifications of the oxidized iron and titanium-containing nanoparticles formed by an alkali metal reduction method according to the present teachings. The particle size ranges from about 4 nm to about 13 nm.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of producing nanoparticles, comprising
providing an iron-containing organometallic component and a titanium-containing organometallic component;
contacting the iron-containing organometallic component and the titanium-containing organometallic component in the presence of a surfactant;
heating the iron-containing organometallic component, the titanium-containing organometallic component and the surfactant to produce iron and titanium-containing nanoparticles;
providing a metal-containing precursor;
contacting the iron and titanium-containing nanoparticles with the metal-containing precursor; and
heating the iron and titanium-containing nanoparticles and the metal-containing precursor to produce metal-capped iron and titanium-containing nanoparticles,
wherein the metal-containing precursor comprises an organometallic component capable of forming metal-capped nanoparticles.

2. The method according to claim 1, wherein the organometallic component capable of forming metal-capped nanoparticles comprises an organic portion comprising one or more element selected from the group consisting of acetate, formate, carbonate, acetylacetonate, acetonitrile, tetrahydrofuran, cyclopentadienyl, cyclooctyldienyl and carbonyl, and
a metal portion comprising one or more element selected from the group consisting of cobalt, ruthenium, iridium, nickel, palladium, platinum, copper, silver and gold.

3. The method according to claim 2, wherein the organometallic component capable of forming metal-capped nanoparticles comprises one or more element selected from the group consisting of nickel(II) acetylacetonate, nickel tetracarbonyl, copper(II) acetylacetonate, copper(II) acetate, bisacetonitriledichloropalladium(II) and palladium(II) acetylacetonate.

4. The method according to claim 1, wherein the metal-containing precursor comprises a metal halide or nitrogen oxide-containing component capable of forming metal-capped nanoparticles.

5. The method according to claim 4, wherein the metal halide or nitrogen oxide-containing component capable of forming metal-capped nanoparticles comprises a metal portion comprising one or more element selected from the group consisting of cobalt, ruthenium, iridium, nickel, palladium, platinum, copper, silver and gold, and
a halide or nitrogen oxide-containing portion comprising one or more element selected from the group consisting of chloride, bromide, nitrite and nitrate.

6. The method according to claim 4, wherein the metal halide or nitrogen oxide-containing components comprise one or more elements selected from the group consisting of $PdCl_2$, $CuCl_2$, $NiCl_2$, $Pd(NO_3)_2$, $Cu(NO_3)_2$ and $Ni(NO_3)_2$.

7. The method according to claim 1, wherein the particle size of the iron and titanium-containing nanoparticles is controlled by varying the surfactant concentration.

8. The method according to claim 1, wherein the particle size of the iron and titanium-containing nanoparticles is less than about 6 nanometers.

9. The method according to claim 8, wherein the particle size of the iron and titanium-containing nanoparticles is less than about 4 nanometers.

10. The method according to claim 1, wherein the surfactant comprises one or more element selected from the group consisting of oleic acid, oleyl amine, trioctylphosphine oxide, trioctyl phosphine, stearic acid and cetyltrimethylammonium bromide, a mixture of polyoxyethylene tert-octylphenyl ethers and polysorbate 80.

11. The method according to claim 1, wherein the iron-containing organometallic component comprises one or more element selected from the group consisting of iron pentacarbonyl, iron cyclooctyldienyl and iron acetylacetonate.

12. The method according to claim 1, wherein the titanium-containing organometallic component comprises one or more element selected from the group consisting of bis(cyclopentadienyl)dicarbonyl titanium, titanium alkoxides, titanium isopropoxide, titanium butadiene, and bistoluene titanium.

* * * * *